(12) United States Patent
Sun et al.

(10) Patent No.: US 7,558,238 B1
(45) Date of Patent: Jul. 7, 2009

(54) HYBRID MULTIPLE ACCESS WAVEFORM, METHOD, AND APPARATUS

(75) Inventors: June Sun, Salt Lake City, UT (US); Thomas R. Giallorenzi, Riverton, UT (US); Michael Rice, Provo, UT (US); Samuel C. Kingston, Salt Lake City, UT (US); Johnny M. Harris, Centerville, UT (US)

(73) Assignee: L-3 Communications Corporation, New York, NY (US)

( * ) Notice: Subject to any disclaimer, the term of this patent is extended or adjusted under 35 U.S.C. 154(b) by 400 days.

(21) Appl. No.: 11/335,439

(22) Filed: Jan. 18, 2006

(51) Int. Cl.
*H04B 7/216* (2006.01)
(52) U.S. Cl. ............... 370/335; 370/337; 370/342; 370/442; 370/210; 455/552.1
(58) Field of Classification Search ............ 370/210, 370/342, 335, 337, 442; 455/552.1; 375/302
See application file for complete search history.

(56) References Cited

U.S. PATENT DOCUMENTS 6,160,801 A * 12/2000 Uchida et al. ............... 370/337
2002/0141435 A1 * 10/2002 Newberg et al. ............ 370/442
2004/0001429 A1 * 1/2004 Ma et al. .................... 370/210
2005/0063345 A1 * 3/2005 Wu et al. .................... 370/335
2006/0209986 A1 * 9/2006 Jensen et al. ............... 375/302
2007/0093262 A1 * 4/2007 Li et al. ..................... 455/552.1

* cited by examiner

*Primary Examiner*—Charles N Appiah
*Assistant Examiner*—Michael T Vu
(74) *Attorney, Agent, or Firm*—Harrington & Smith, PC

(57) ABSTRACT

A method for partitioning communication resource among multiple users partitions a portion of an available communication resource into a series of time-frequency slots, and allows multiple users to transmit in one of at least two available modes within a time-frequency slot. Preferably, one mode is time division of the time-frequency slot into time sub-slots, and another mode is code division of the time-frequency slot according to different spreading codes that spread an individual user's signal only within the subject time-frequency slot. Further details as to pilot signals, guard intervals, and payloads are described.

7 Claims, 14 Drawing Sheets

| FIG.7A | FIG.7B | FIG.7C | FIG.7D |
| --- | --- | --- | --- |
| FIG.7E | FIG.7F | FIG.7G | FIG.7H |

HYBRID MULTIPLE ACCESS WAVEFORM, METHOD, AND APPARATUS

FIELD OF THE INVENTION

The present invention relates to multiple access communications waveform systems and methods and apparatus to implement them. It is particularly directed to a waveform that supports user access according to one of several modes, and especially that supports simultaneous use of the several modes.

BACKGROUND

To meet the need for ever-increasing information capacity in wireless communication systems, research efforts have recently turned to the physical layer to increase spectral efficiency. Multiple access systems in general allow many users to share spectrum allocated to the particular communication system on which they communicate, so that any discrete communication flows between select nodes but not necessarily all nodes on the network. One aspect of this research relevant to this invention is in the area of multiuser receivers. These receivers seek to minimize interference between mutual users of a spread spectrum wireless system, and generally include multiuser detectors, linear decorrelators, and linear minimum mean-square-error (MMSE) receivers.

The bulk of multiuser research has been in the context of cellular wireless communications, in which a base station of a cell simultaneously receives signals from multiple users and the individual users in the cell operate as traditional RAKE or otherwise single user receivers. Such cells are geographically based, and their geographic isolation from other geographically based cells enables a certain flexibility and control that improves spectrum efficiency. For example, where the geographic cell uses a spread spectrum system such as CDMA (in any of its standardized forms), power control among the various users is assumed to be within a narrow range, which is enabled by open or closed loop power control as well documented in the art. This is possible because a single base station (or several working in concert as one) receives all communications from mobile users in the cell and coordinates their transmit power levels. The cell-based paradigm also enables individual cells to adapt various parameters in light of traffic conditions, such as using half-rate signaling that may not be appropriate for traffic conditions in neighboring cells. As with power control, this flexibility is possible due to the base station's directive to all other users in the cell.

But while traditional cell-based mobile systems may represent the most ubiquitous and commercially important application of wireless communication systems, there exist other applications and potential applications for wireless systems where the above cell-based pre-conditions do not hold. Specifically, in a mesh topology network such as described below with reference to FIG. 1, any node of the network may serve as a relay point to receive and re-transmit a message from one network node to another, where the two end nodes are beyond a normal direct range of communication with one another. In a traditional cellular system, the extended range is enabled by a base station that interfaces with base stations of other cells. In contradistinction, the relay node in a mesh network is not a designated node serving that purpose, but may be any node within the mesh network that happens to be advantageously positioned. The relay node may change during a series of related bursts between the same end nodes, and multiple relay nodes may serve between the ultimate two end nodes for any individual burst. A typical environment for such a mesh network is one where at least some nodes are highly mobile, such as two aircraft. In such an environment, Doppler effects can become so great that power control for every burst is not practical. Such a system 20 is shown in FIG. 1 and is described particularly below.

FIG. 1 depicts a series of first through seventh nodes, 22 through 34 respectively, communicating with one another over a wireless network, preferably secure. Assume that the first 22 and sixth 32 nodes seek to exchange messages but are out of direct communication range with one another. A burst from the first node 22 may be received and re-transmitted to the sixth node 32 by the second 24 or third 26 nodes. After a short time, the fourth node 28 is better positioned to serve as the relaying node, so follow on bursts between the first 22 and sixth 32 nodes are through it. Later, the first 22 and sixth 32 nodes are in direct range, so the fourth node 28 is no longer needed as a relay point. The range of the network is not tied to a geographic cell as in cellular communications, but varies based on the availability of other network nodes to serve as relays.

Each of the second 24, third 26 and fourth 28 nodes may also be in communication with other nodes simultaneously with relaying messages between the first 22 and sixth 32 nodes, so each preferably operates with a multiuser receiver to avoid delays that would compound in a high traffic environment (such as where each relay node buffers messages to be relayed to await a transmit slot).

The extended range of such a mesh network undermines some assumptions on which prior art communication waveforms are premised. Because the amount of spectrum available for communication is fixed, spectrum is re-used in different geographic areas to increase capacity. For example, frequency division multiple access (FDMA) has not been widely used since the time that mobile communications expanded significantly because FDMA is spectrum inefficient for two reasons: allocated spectrum goes unused for low-volume users, and the geographic separation by which the allocated spectrum may be allocated to another for simultaneous use is relatively large. Time division multiple access (TDMA) suffers from the same problem of unused allocated spectrum. For each, efficient spectrum use requires efficient allocation that relies on a priori knowledge of a users' volume of data to be sent. In the absence of such a-priori knowledge allocation, spectrum goes unused. Code division multiple access (CDMA or spread spectrum) greatly increases efficiency by spreading packets among available slots of time and frequency, and reusing the same time/frequency slot among multiple users (typically UP to eight) is enabled by the use of different spreading codes.

The mesh network of FIG. 1 undermines certain efficiencies of any of the above systems as compared to a single cell of a base-station/multiple user paradigm. Specifically, a single CDMA packet that in the traditional system occupied one time/frequency slot now occupies more than one, because it is re-transmitted by a relaying node at a different slot. The increased range of the mesh network 20 relies on potentially more nodes sharing the same spectrum than the prior art would generally allow. This increase in range, along with the premise that nodes move relatively fast in relation to one another, makes traditional CDMA power control among all users in the mesh network 20 impractical.

What is needed in the art is a communication waveform that offers frequency and time resource sharing, has a large user capacity, high message throughput, high bandwidth efficiency, and variable message update rates. It should also preferably offer long range, line-of-sight and relayed communications, and enable a highly dynamic network geometry for high user mobility.

SUMMARY OF THE INVENTION

This invention is in one aspect a method for partitioning communication resource among multiple users. This method includes partitioning at least a portion of an available communication resource into a series of time-frequency slots, and allowing multiple users to transmit in one of at least two available modes within a time-frequency slot. This is not to say that disparate users may transmit according to the different modes in the same time-frequency slot, but that different time-frequency slots support multiple users by different modes, preferably simultaneously. Preferably, one mode is time division of the time-frequency slot into time sub-slots, and another mode is code division of the time-frequency slot according to different spreading codes that spread an individual user's signal only within the subject time-frequency slot. Further details as to pilot signals, guard intervals, and payloads are described. This method also includes its description as tangibly embodied in a fixed medium, such as a telecommunication standard written on paper, fixed on a computer readable disk or hard drive, or the like.

In another aspect, the inventive method for partitioning a communication resource among multiple users includes defining a series of consecutive time-frequency slots within a frequency band, where each time-frequency slot is separated by a guard interval. Further, the method includes partitioning at least one of the series of time-frequency slots according to a code division multiple access regimen. In such a regimen, a spreading code spreads an individual user's signal over a unique set of time and frequency bounds. As opposed to the prior art, every time and frequency bound of the set is constricted to be within the at least one of the series of time-frequency slots. This method also includes its description as tangibly embodied in a fixed medium, such as a telecommunication standard written on paper, fixed on a computer readable disk or hard drive, or the like.

These and other features, aspects, and advantages of embodiments of the present invention will become apparent with reference to the following description in conjunction with the accompanying drawings. It is to be understood, however, that the drawings are designed solely for the purposes of illustration and not as a definition of the limits of the invention.

BRIEF DESCRIPTION OF THE DRAWINGS

The present invention is described below more particularly with reference to the following drawing figures, which are not to scale except where stipulated.

DETAILED DESCRIPTION

Figure 1:
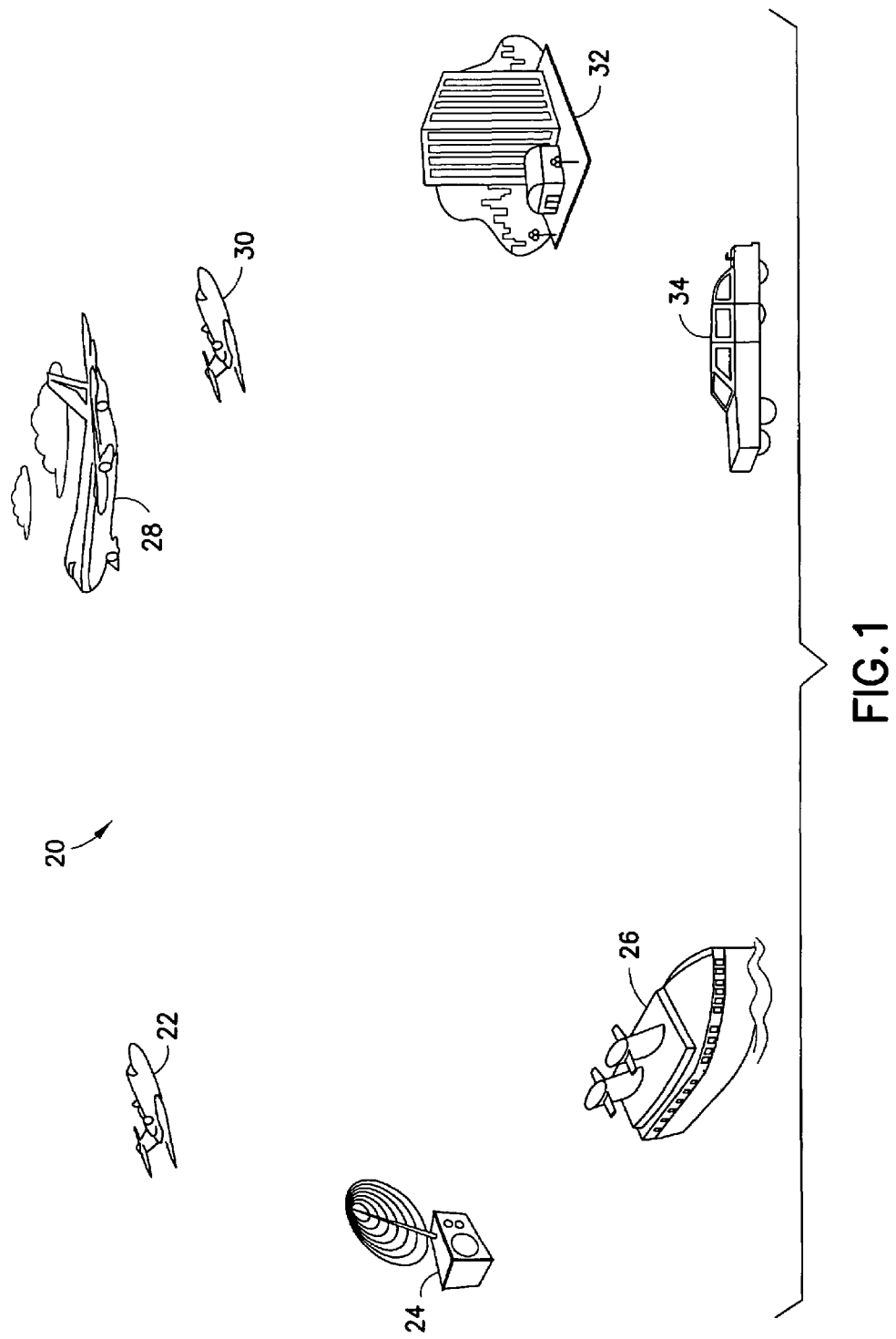
FIG. 1 is a schematic diagram of nodes in a wireless mesh network communication system.

This patent application describes a novel multiple access waveform, based on a hybrid TDMA/FDMA/CDMA architecture, for wireless meshed-topology communication networks. A conceivable application of this waveform would be military test ranges. Traditional stand-alone multiple access schemes such as TDMA, FDMA, CDMA and Aloha, and combined TDMA/FDMA schemes have been used previously for wireless meshed-topology communication systems. The multiple access scheme according to the preferred embodiment employs TDMA, FDMA and CDMA simultaneously in order to achieve the most flexibility and capacity using the same communications resource. The term Multi-mode Range Waveform (MRW) is used herein to refer to a hybrid communication waveform that uses both time division multiplexing (TDMA) and time division multiple access (TDM). It is TDMA in the sense that for each frequency band, the time resource is partitioned into a series of (preferably 10 ms) time slots that can be assigned to participants in the network for multiple access. And within each time-frequency slot, TDM is the transmit mode a relay node uses to burst multiple messages. Using the terminology of the prior art, MRW is a hybrid of legacy schemes CDMA and either or both of TDMA and FDMA, combining the best features of each to provide a waveform that is more capable than any one of these multiple access schemes alone. MRW is specifically designed to maximize advantages in a mesh network such as that of FIG. 1. MRW can support multiple frequency bands simultaneously, and each of these frequency bands has their own allocation of time slots that are independent of those of adjacent frequency bands, though the time slot epochs may be consistent among the various frequency bands for efficiency.

In general, the present invention partitions the communication resource (that portion available to the network 20) into a series of time-frequency slots. A communication resource includes available frequency spectrum, time, and spreading codes. Preferably, each of these time-frequency slots is bounded by a frequency band that spans either 6.8 MHz or alternatively 3.4 MHz. Access by multiple users is through one of two different modes. In one mode, the multiple users may access the spectrum by different spreading codes (typically a maximum of eight) applied over a time-frequency slot. These are termed code sub-slots. In another mode, the time-frequency slots are divided into concatenated time sub-slots that occupy a time-frequency slot. All multiple users within a slot access the resource by only one of the two modes. That is, a single time-frequency slot is preferably not parsed into both time sub-slots and code sub-slots, to ensure the spreading code (where used) has a sufficiently broad time span over which to spread. A code sub-slot is similar to a traditional CDMA slot of a message, but the time and frequency bounds of a code sub-slot are limited to the time and frequency boundaries of the overall time-frequency slot into which it applies in the present invention, rather than to the entire available resource.

MRW partitions frequency spectrum into frequency bands. For each frequency band, time is partitioned into time slots in a TDMA fashion, yielding time-frequency slots. For each time-frequency slot, two modes of message transmission exist. One mode partitions the time-frequency slot into code sub-slots according to a spreading code, and different users' messages may occupy the different code sub-slots. Another mode partitions the time-frequency slot into time sub-slots, and different users' messages may occupy the different time sub-slots.

Figure 2:
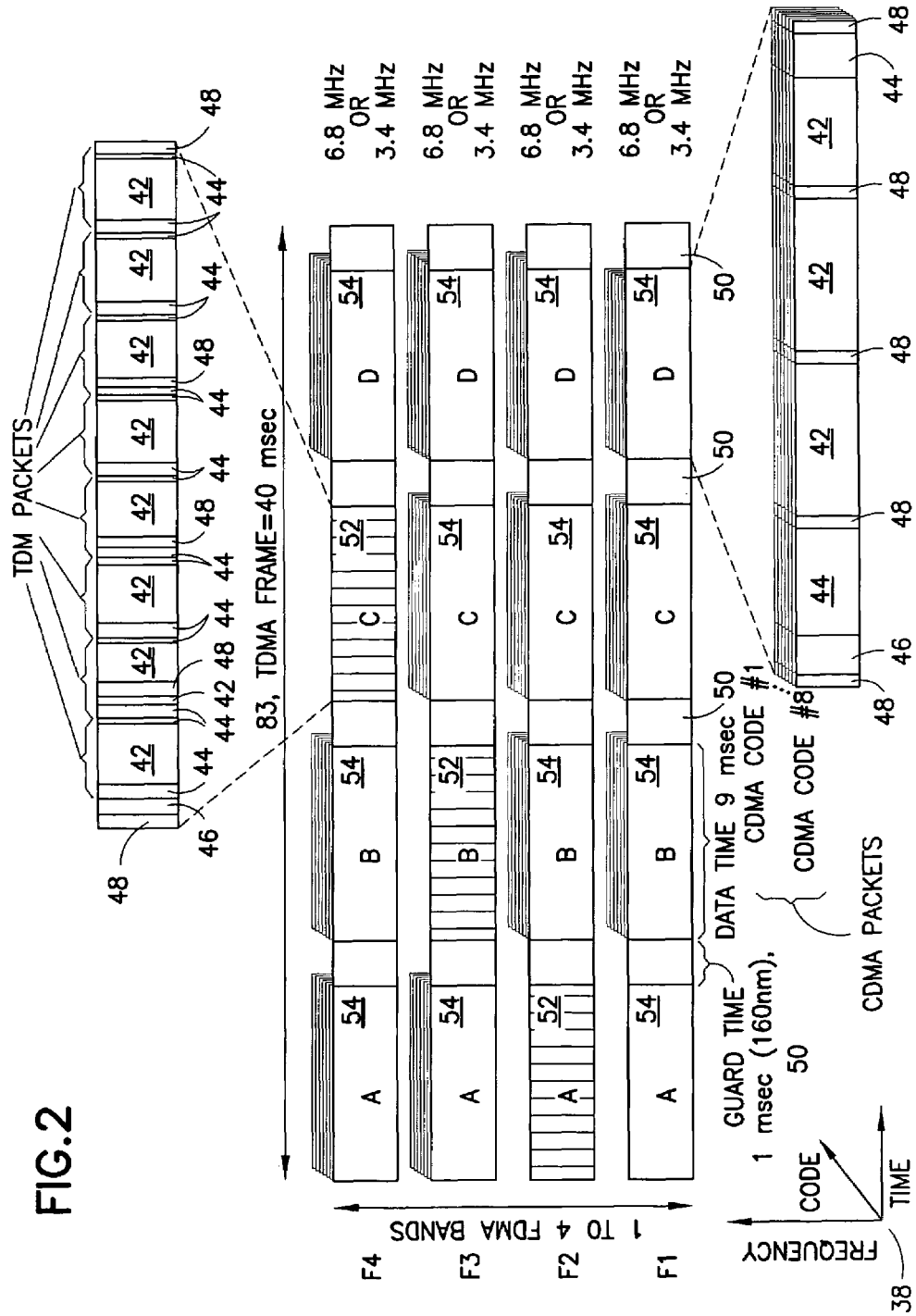
FIG. 2 is a schematic drawing of the preferred embodiment of the waveform that enables multiple access within the various time-frequency slots of the spectrum according to both a first time-partitioning mode and a second code-partitioning mode.

FIG. 2 is a schematic drawing of the spectrum parsed according to the preferred embodiment of the present invention. A frame 40, preferably 40 msec in duration, includes time-partitioned bursts 52 and code-partitioned bursts 54, by which the respective bursts are partitioned for multiple access via a first time mode or a second spreading code mode. Shown are four time-frequency slots A-D in each of four different frequency bands F1-F4. As indicated by the axes legend 38, time distinction is along the horizontal, frequency distinction is along the vertical, and code distinction is along an axis normal to the page. The communication resource that is available for use in the mesh network system 20 is first parsed according to a frequency division like FDMA into four different frequency bands, F1, F2, F3, and F4. The resource in each of the frequency bands F1-F4 is then parsed into a series of time-frequency slots A, B, C, D. The time-frequency slots A-D of the different frequency bands F1-F4 are synchronous and preferably separated by a guard interval 50. They are synchronous in order that access may be via either of the two modes simultaneously. That is, multiple access may be obtained in a first time-frequency slot A of one frequency band F1 via code sub-slots, and in that same first time-frequency slot A of another frequency band F2 via time sub-slots. Synchronous time-frequency slots also enables multiple access into sequential time-frequency slots of one frequency band by different modes, such as time sub-slots in time-frequency slot A of frequency band F2 and code sub-slots in time-frequency slot B of that same frequency band F2.

The particular modes of multiple access in FIG. 2 are detailed. Consider the time-frequency slot C of the frequency band F4 (slot C/F4), which is shown in exploded view in FIG. 2. A total of eight time sub-slots are available, for use by up to eight different users within that overall C/F4 slot of time/frequency. Various resource allowances are indicated for overhead 44, network control and maintenance 46, and acquisition pilot signals 48. What remains are eight payloads 42 within slot C/F4 that may carry data from each of eight different users. Of course, less active users within a particular slot C/F4 might entail more than one payload 42 carrying data from one user so as not to waste the resource. However, partitioning of the time-frequency slot according to the first mode into time sub-slots supports a maximum number of disparate users, preferably eight.

Now consider the time-frequency slot D of the frequency band F1 (slot D/F1), which is also shown in exploded view in FIG. 2. A total of eight code sub-slots are available, for use by up to eight different users within that overall D/F1 slot of time/frequency. Various resource allowances are again indicated for overhead 44, network control and maintenance 46, and acquisition pilot signals 48. What remains are three payloads 42 within each code sub-slot of the overall time-frequency slot D/F1 that carry data from a single user for each code sub-slot. The code-partitioned time-frequency slots 54 enable up to the maximum number of (preferably eight) multiple users via different spreading codes. Preferably, both the first and second modes support the same maximum number of disparate users. The MRW's ability to carry eight messages per time-frequency slot in the first or second modes of operation allows communication at 800 messages per second in each frequency band in both standard and relay configurations, even where both communicating nodes are not ground based.

According to the preferred embodiment, time is portioned into 10 ms time-frequency slots each having a message time of 9 ms and a guard interval 50 duration of 1 ms. The 1 ms guard time will prevent collisions between adjacent-slots between any pair of network nodes that are closer than 300 km. The operating frequency bands F1-F4 nominally have 60-dB-bandwidth of 6.8 MHz to accommodate packetized messages each having a net size of 1800 bits. However, it is conceivable to meet the same requirement with half that bandwidth by employing a more complex receiver. This ability to trade complexity for spectral efficiency is unique to MRW, as standalone TDMA, FDMA and Aloha-style schemes have a hard capacity limit.

In the time-frequency slots that are code-partitioned 54, up to at least eight messages can be sent simultaneously on different spreading codes (often called pseudo-noise or PN codes) for the standard case where the processing gain is 15 chips per channel symbol or approximately 12 dB. Acquisition of the eight users in each time frequency bin is performed using an iterative approach. In the architecture illustrated in FIG. 2, each time/frequency burst is recorded in a random access memory, and is then block processed during the subsequent 10 msec time interval. The chip timing is determined first by synchronizing matched filters to each of the spread symbols and providing time of arrival and signal level estimates to be used for subsequent estimation and elimination of multiuser CDMA interference. Next, multiuser equalization is performed with a minimum mean squared error (MMSE) interuser-equalizer, and finally carrier phase and frequency estimation is performed after the MMSE equalization improves the symbol SNR. A detailed study was performed to determine that this approach will be successful in locking to all eight users with a probability of greater than 99.9% even when the weakest users are at the maximum range with the maximum Doppler uncertainty.

The code-partitioned mode preferably rims with a direct-sequence quadraphase spread spectrum waveform, using quadrature phase-shift keying (QPSK) modulation with a data rate of 200 kbps. The MRW preferably uses state-of-the-art turbo code technology to achieve the highest theoretically possible level of bandwidth and power efficiency. Specifically, the MRW preferably uses the same rate 1/2 parallel-concatenated turbo code proven by the FAB-T XDR MIL-STAR waveform. However, any general turbo-code may be used.

Figure 3:
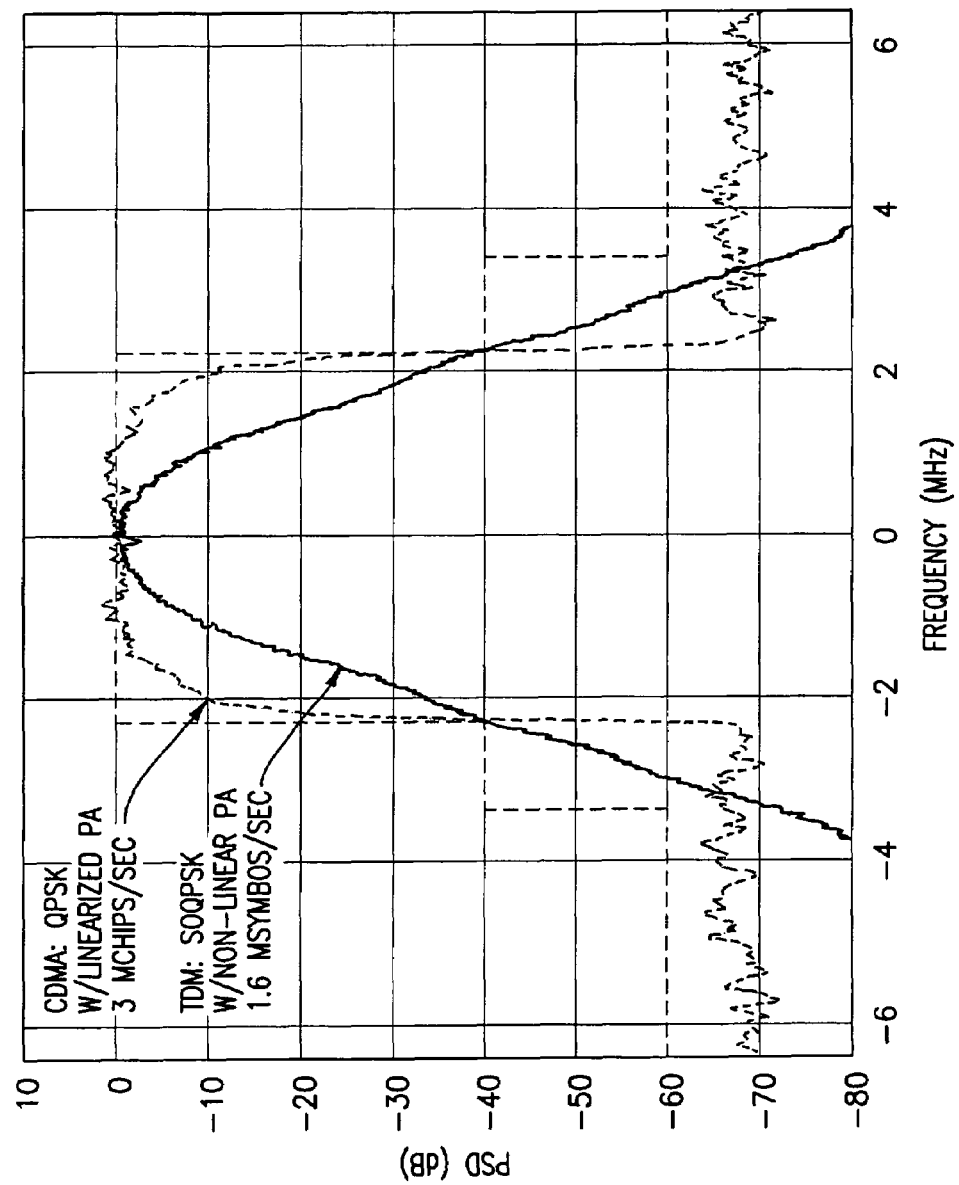
FIG. 3 is a graph showing a comparison of power spectral density for QPSK modulation in the code-partitioned time-frequency slots and SOQPSK modulation in the time-partitioned time-frequency slots.

The processing gain is preferably 15 chips per channel symbol yielding a chip rate of 3 Megachips per second. The chip sequence is preferably pulse-shape filtered with a square-root raised-cosine pulse shape filter having a roll off factor of 0.45 in order to confine the 40-dB and 60-dB bandwidths of the waveform within 4.5 MHz and 6.8 MHz respectively. A plot of a simulated power spectral density (PSD) of the MRW running in the code-partitioned mode is shown as the more squarish graph in FIG. 3.

A key benefit with the code-partitioning mode is that it employs a variable processing gain, wherein other than 15 chips per channel symbol can be supported to achieve other signaling rates and message concatenation. The capacity of a time-frequency slot 54 will drop to four simultaneous users if they are each concatenating two messages and using a processing gain of 7 chips per channel symbol, resulting in each time-frequency slot carrying at least 8 messages regardless of rate.

In the time partitioning mode, a time-frequency slot 52 is used to send up to eight concatenated messages within approximately 9 milliseconds. Time partitioning can be conceptually viewed as a code-partitioning mode with one chip per channel symbol (and one supported user per time-frequency slot 52) for a message concatenation of eight messages (eight time-partitioned payloads 42). This mode permits large amounts of data to be relayed with the minimum possible transmit power.

In the time partitioned mode, the signal is unspread, preferably with a symbol rate of 1.586 Mbps using shaped offset QPSK (SOQPSK) and the same rate ½ turbo code. A simulated power spectral density of the MRW running in the time-partitioned mode is shown as the annotated (more peaked) trace in FIG. 3. The use of SOQPSK, a constant-envelope modulation, makes it possible to run a power amplifier saturated, which reduces the power amp requirement imposed by the higher data rate of time-partitioning operation. To support eight 1800 bit bursts plus at this rate, the burst time is preferably (exactly) 9.08 milliseconds and the guard time is preferably 0.92 milliseconds, or slightly less than the code-partitioning mode's guard time. This guard time prevents any collisions with participants within about 149 nautical miles. Preferably, direct communication between nodes of the mesh network of FIG. 1 is via the code partitioning mode (code sub-slots), whereas the time partitioning or TDM mode (time sub-slots) is used when a node acts as a relay. A node acting as a relay for messages between other nodes preferably receives and deciphers CDMA messages from multiple users, and bursts them out to their final destination (or to another relay node) within time sub-slots. While a relay node may receive (from an originating node) a message to be relayed via CDMA in a code sub-slot according to the code-partitioning mode of multiple access, it will transmit the message being relayed in an unspread time sub-slot according tot eh time partitioning mode of multiple access.

Figure 4A:
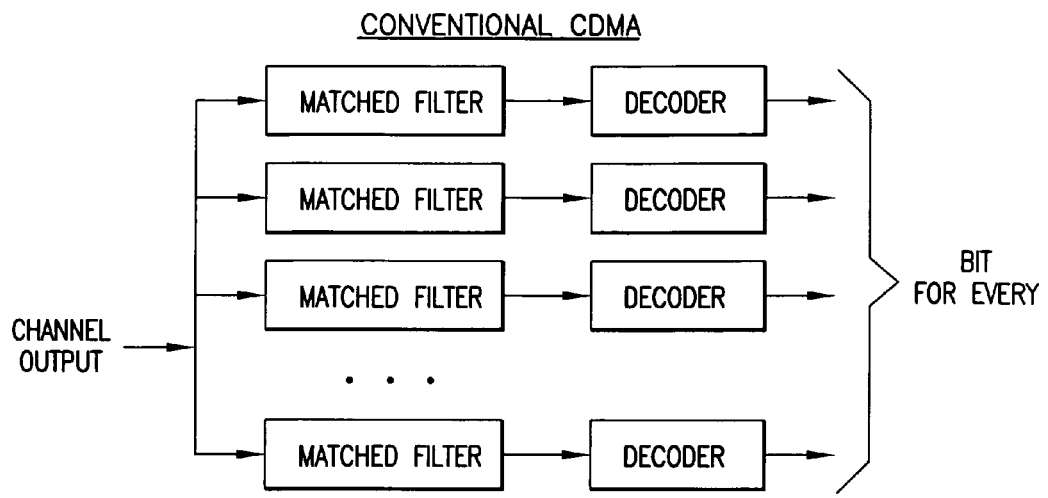
FIG. 4A is a schematic block diagram of a prior art conventional CDMA receiver.

Traditionally, spread spectrum systems have not been considered for wireless mesh-topology networks, due to what is termed the near-far problem (strong CDMA users overwhelming weak CDMA users) noted in the Background section above. It is widely accepted that the near-far problem becomes more problematic as the number of users in a system increases, and as the range of those users is extended. However, the inventors have determined that the near-far problem is not a fundamental obstacle in deploying a spread spectrum approach to a mesh network. The inventors believe that the near-far problem is widely viewed as limiting for mesh networks is due to many engineers' being familiar only with the architecture of conventional CDMA receivers, as shown in FIG. 4A. A conventional CDMA receiver simply match-filters, decodes and detects individual users independently and does not suppress remaining interference that CDMA users may have on one another. A multiuser CDMA receiver as in FIG. 4B conversely employs a joint detection procedure. Preferably, such a receiver operates iteratively on signals grouped according to received power. In such an arrangement, all received user signals are first estimated in a similar fashion as in a conventional CDMA receiver and then actively removed from their non-intended recipients.

Multiuser CDMA receivers may be adapted to solve the near-far problem, making a spread spectrum (code-partitioning) approach not only compatible with but also advantageous for a mesh network 20. Such receivers are detailed further at FIG. 7.

Figure 5:
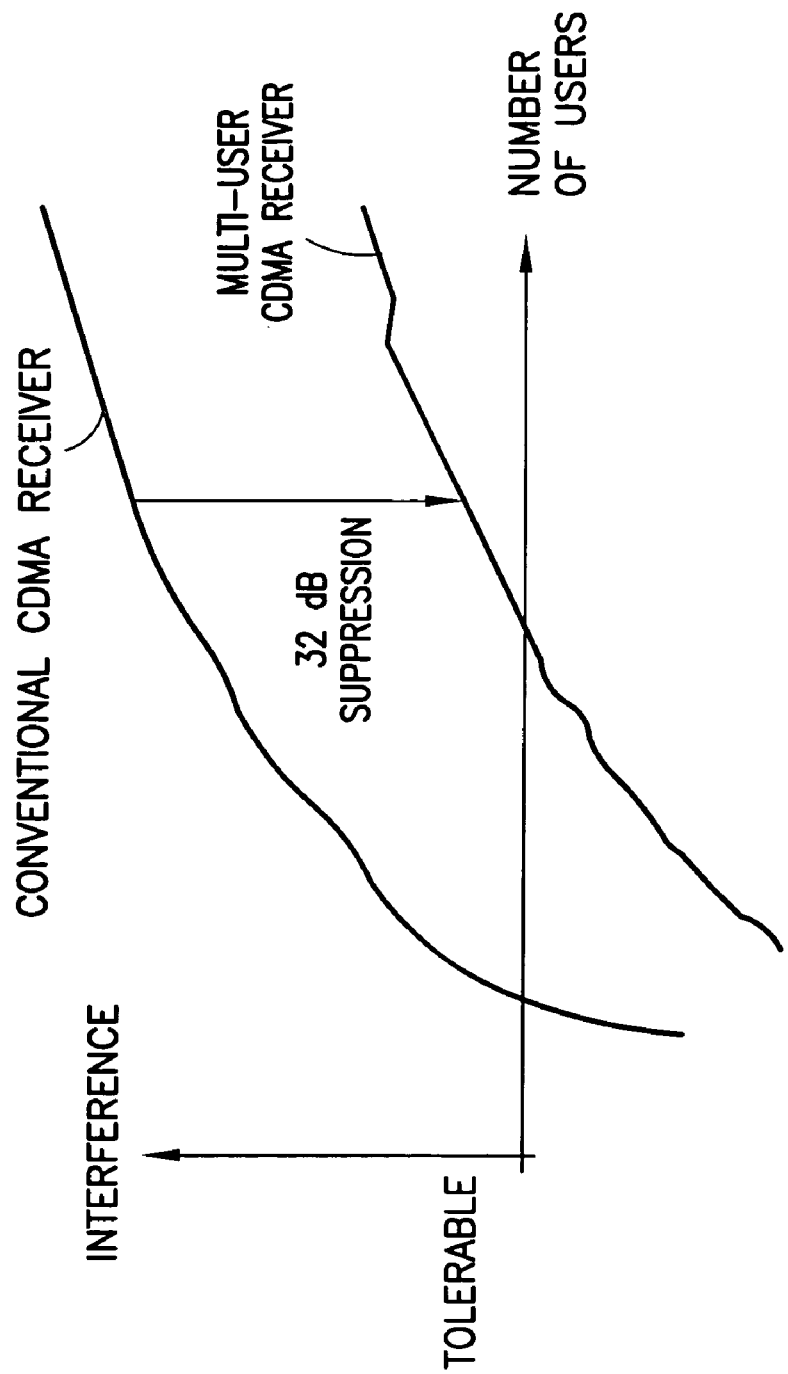
FIG. 5 is a graph comparing multiuser interference between a conventional CDMA receiver of FIG. 4A and a multi-user CDMA receiver of FIG. 4B.

FIG. 5 is a graph showing that the multiuser interference that spread spectrum users cause each other is decreased by about 32 dB in the preferred waveform of the present invention. This shows that far more users may be supported with receivers having a multi-user decoder and operating in the code-partitioning mode than is possible with a conventional CDMA receiver. This tolerance of 32 dB of near-far power imbalance is equivalent to saying that a multiuser CDMA receiver is capable of tolerating transmissions from interfering participants who are 40 times closer in distance than a desired transmitting participant (where the distance ratio of 40 is determined as $\sqrt{10^{(32/10)}}$). Moreover, with automatic continuously variable power control of individual participants in the network, a near-far power imbalance in excess of 32 dB can also be tolerated.

Figure 4B:
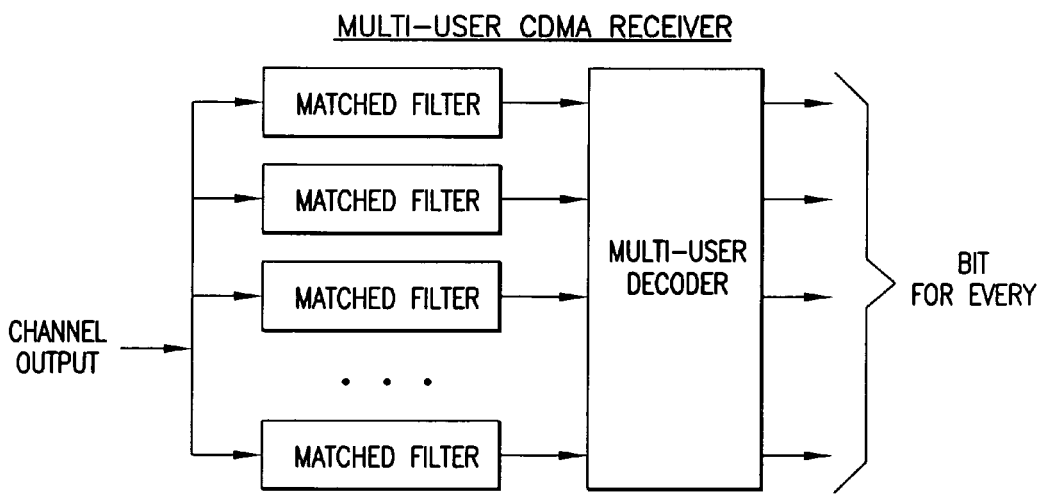
FIG. 4B is a schematic block diagram of a multi user receiver employing a multi-user detector for operating in the code-partitioned mode of the present waveform.
Figure 6:
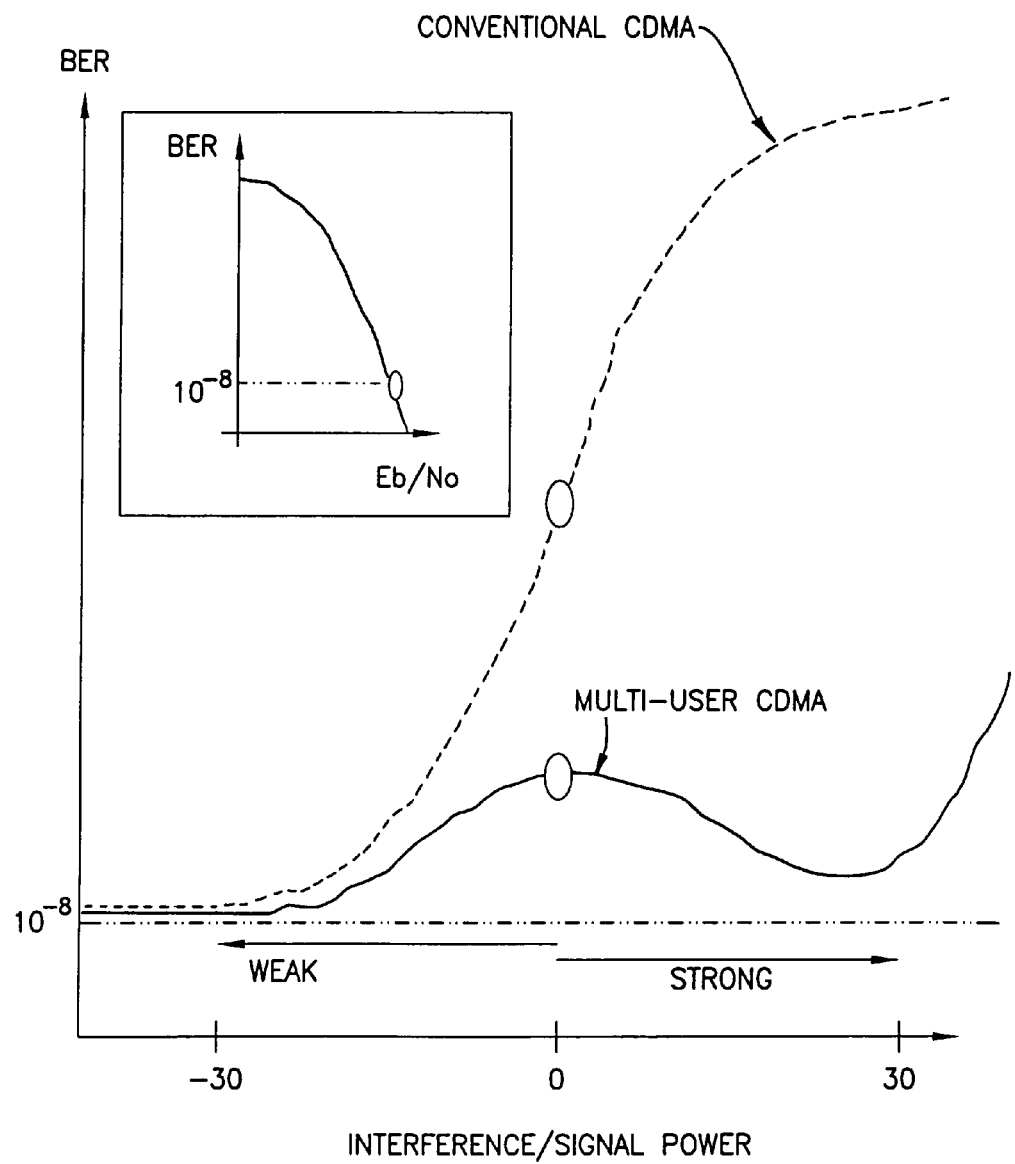
FIG. 6 is a graph comparing bit error rate to the ratio of interference to signal power for a conventional CDMA receiver of FIG. 4A and a multi-user CDMA receiver of FIG. 4B.

FIG. 6 is a graph comparing bit error rate to the ratio of interference to signal power for both a conventional CDMA receiver of FIG. 4A and a multi-user CDMA receiver of FIG. 4B. While both operate similarly at very weak interference levels, the multi-user receiver outperforms the conventional receiver at nearly all non-negligible ratios of interference to signal power. In fact, the negative slope portion of the multi-user receiver line shows that multiuser CDMA receivers are not only tolerant of the near-far problem, but their performance actually improves when the various spread spectrum receivers operate with a received power imbalance. Conventional CDMA receivers, such as those of FIG. 4A, become unusable when the interfering CDMA user signal becomes stronger than that of the desired user.

There are other important reasons why code sub-slots provide a significant improvement over the other approaches. With code sub-slots, the required power amplifier is dramatically smaller than with a pure TDMA approach because the symbol transmission rate is far lower with code partitioning. Even in the time-partitioning mode of the preferred embodiment of the present invention, bursts are at rates well above 1 Mbps, while the code-partitioned mode of the preferred embodiment runs at a bit rate of 200 kbps, implying that much less power is required to close a link at the desired range. The reason the time-partitioning mode is also provided by MRW is to be able to handle multiple-message concatenation for bulk relay or download of messages as noted above. The smaller required power amplifier translates into a hardware design that incorporates a much lower risk of operational failure, because it is less thermally stressed and it has a higher reliability. Alternative approaches requiring a much higher-output power amp will have thermal problems, even if the low-duty cycle of the transmitter is taken into account. Thermal control became an important factor in the inventors concluding that the code-partition based MRW is a superior approach for wireless mesh-topology applications.

Additional reasons why the code-partitioned based MRW is an attractive approach include the following:
   Code partitioning of time-frequency slots offers a graceful tradeoff between range, capacity and margin. In other words, MWR does not hit a hard limit on any of these, and one may be diminished to expand the other two. Other known approaches exhibit a hard limit.
   Code-partitioning is lower-risk compared to alternative approaches, in that it's more tolerant to coexistence with other systems that are co-site and co-band because of the 12 dB processing gain that the waveform provides.

Code-partitioning is more tolerant than alternative approaches to timing degradation. In other words, there is no need for fancy clocks.

Code partitioning allows the system designed to trade receiver complexity for capacity. This means that as long as the field programmable gate arrays (FPGAs) are sized to accommodate extra gates, a future firmware upgrade can provide a more sophisticated multiuser spread spectrum receiver capable of supporting a higher capacity with the same hardware.

Figure 7A:
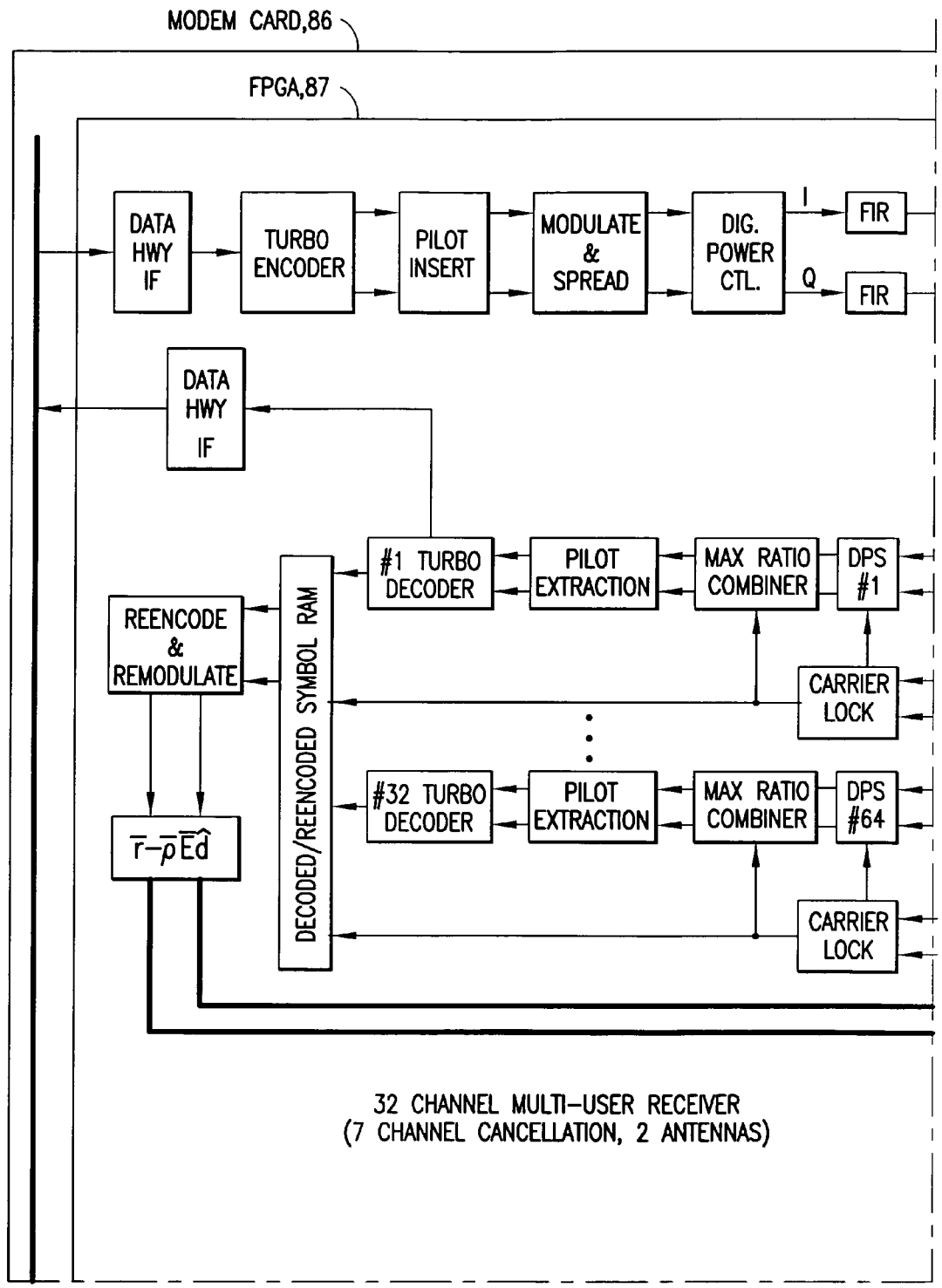
FIG. 7 is a block diagram of a spread spectrum multi-user receiver using joint detection, for use with the waveform of FIG. 2.
Figure 7B:
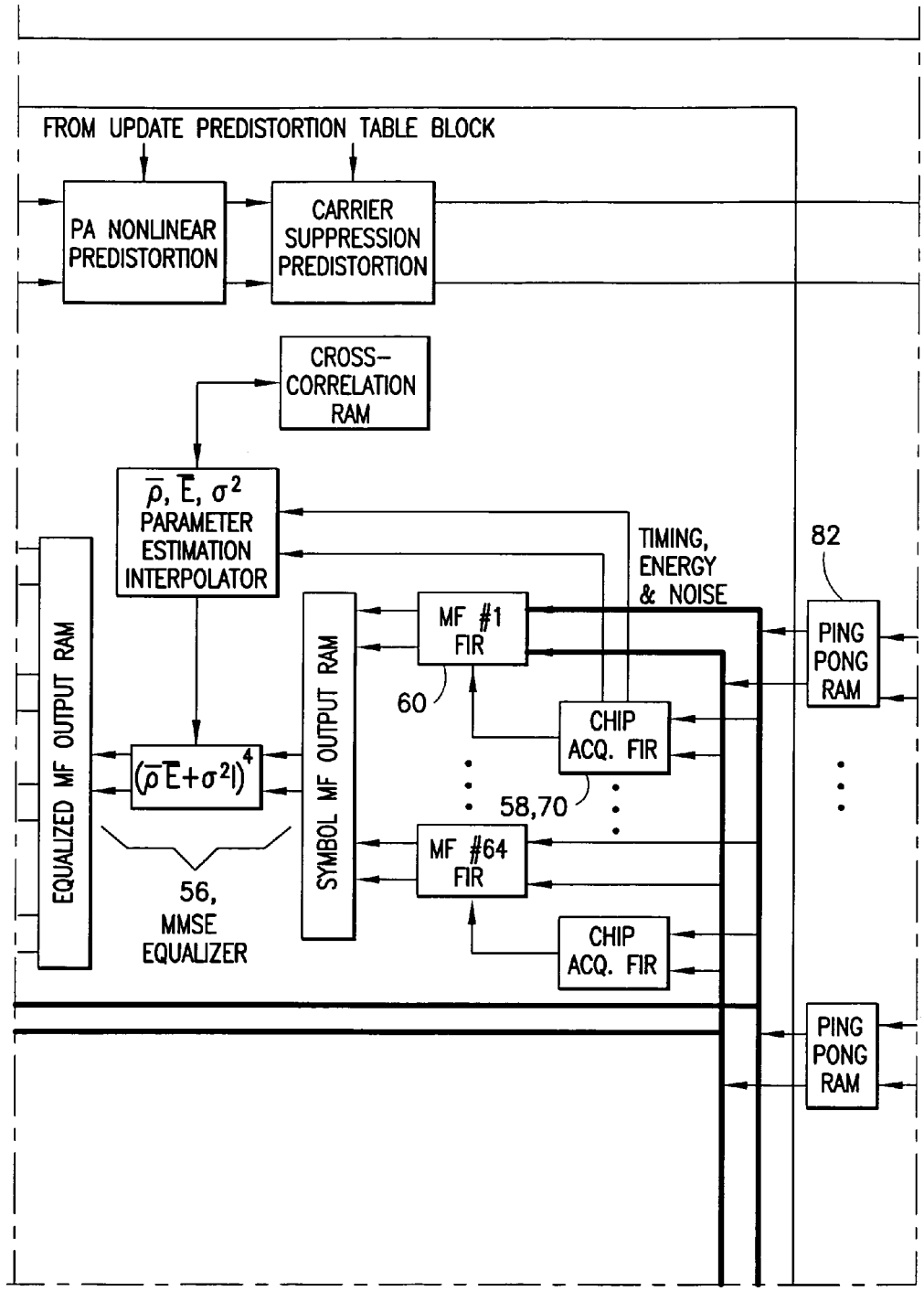
Figure 7C:
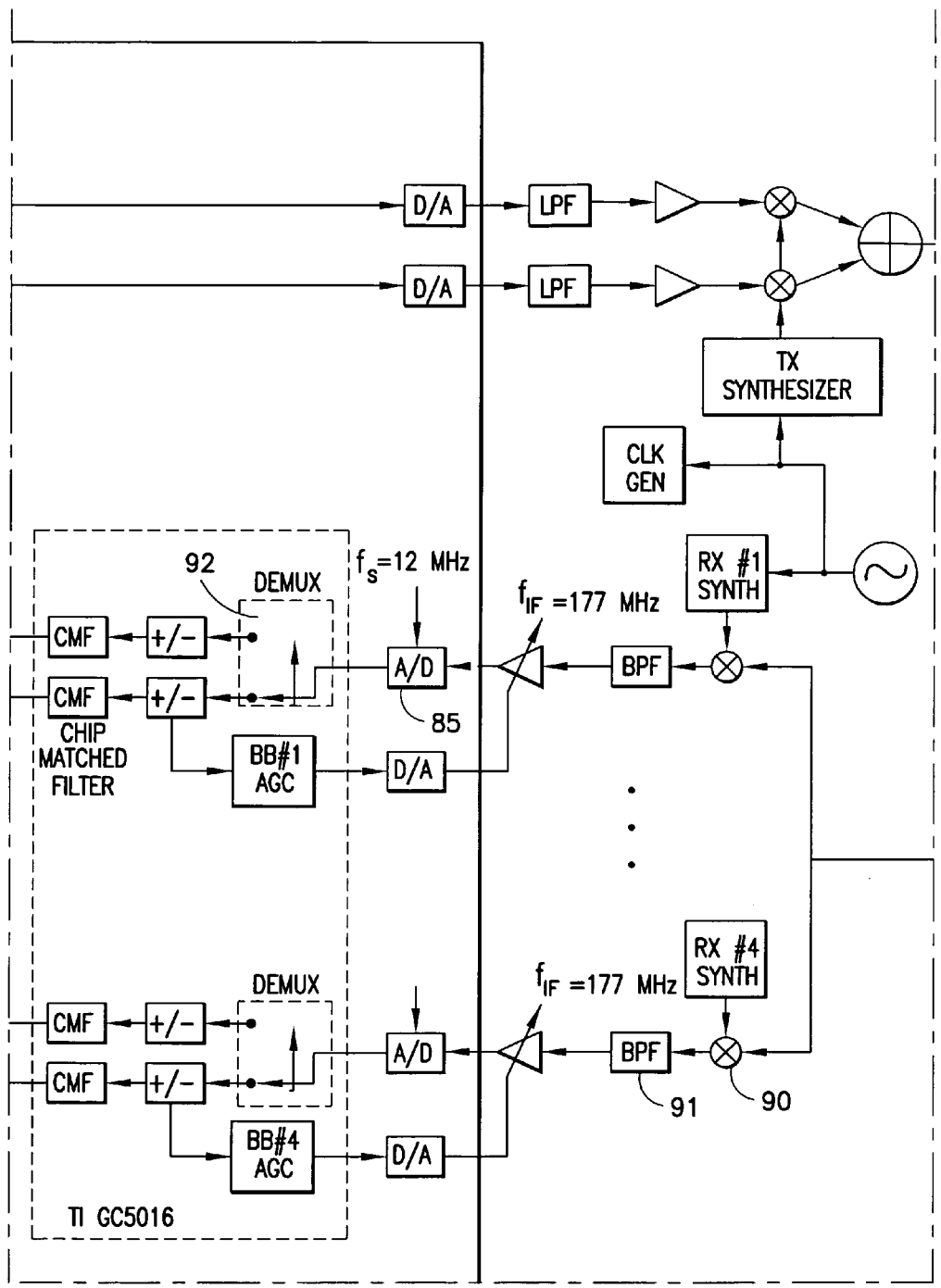
Figure 7D:
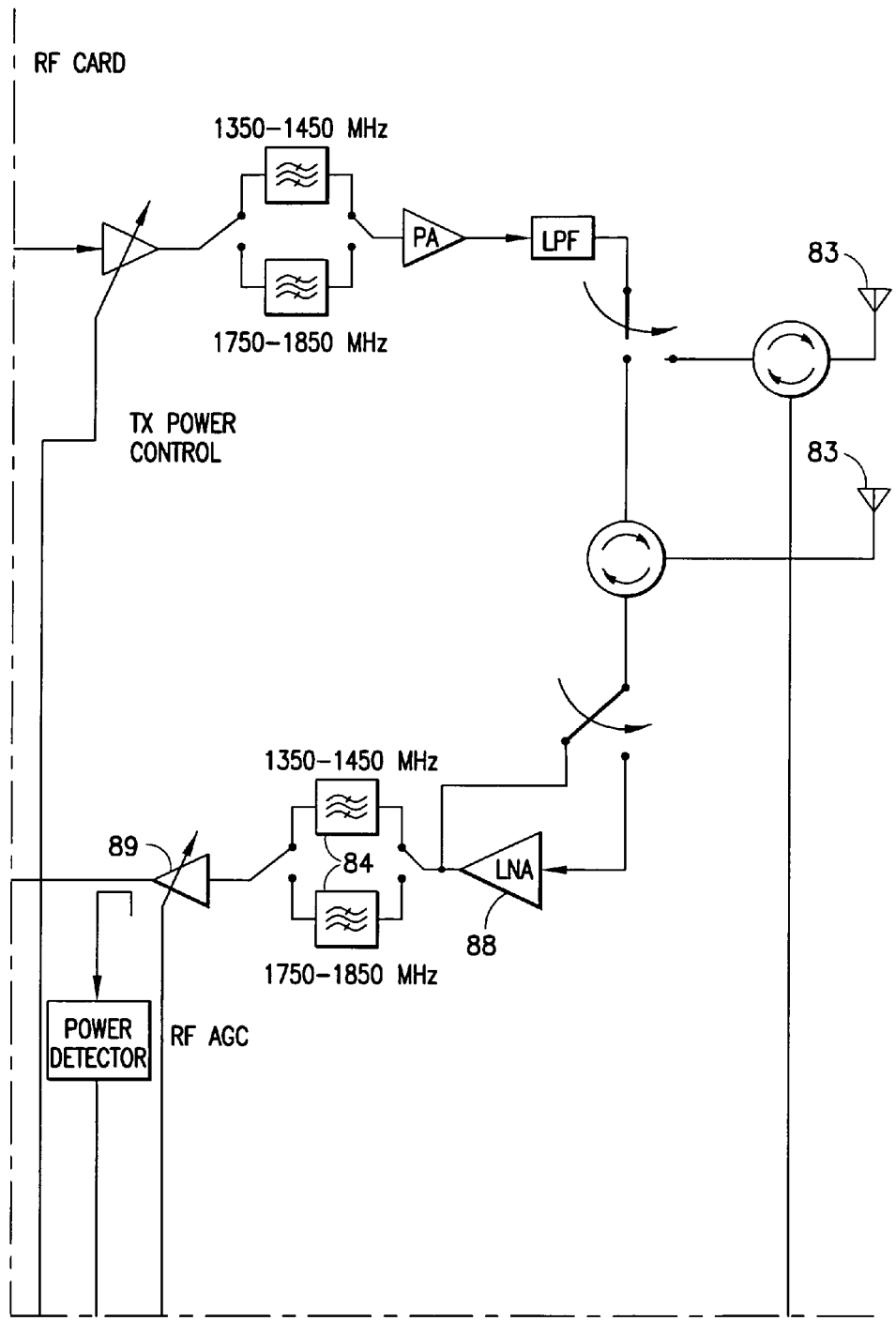
Figure 7E:
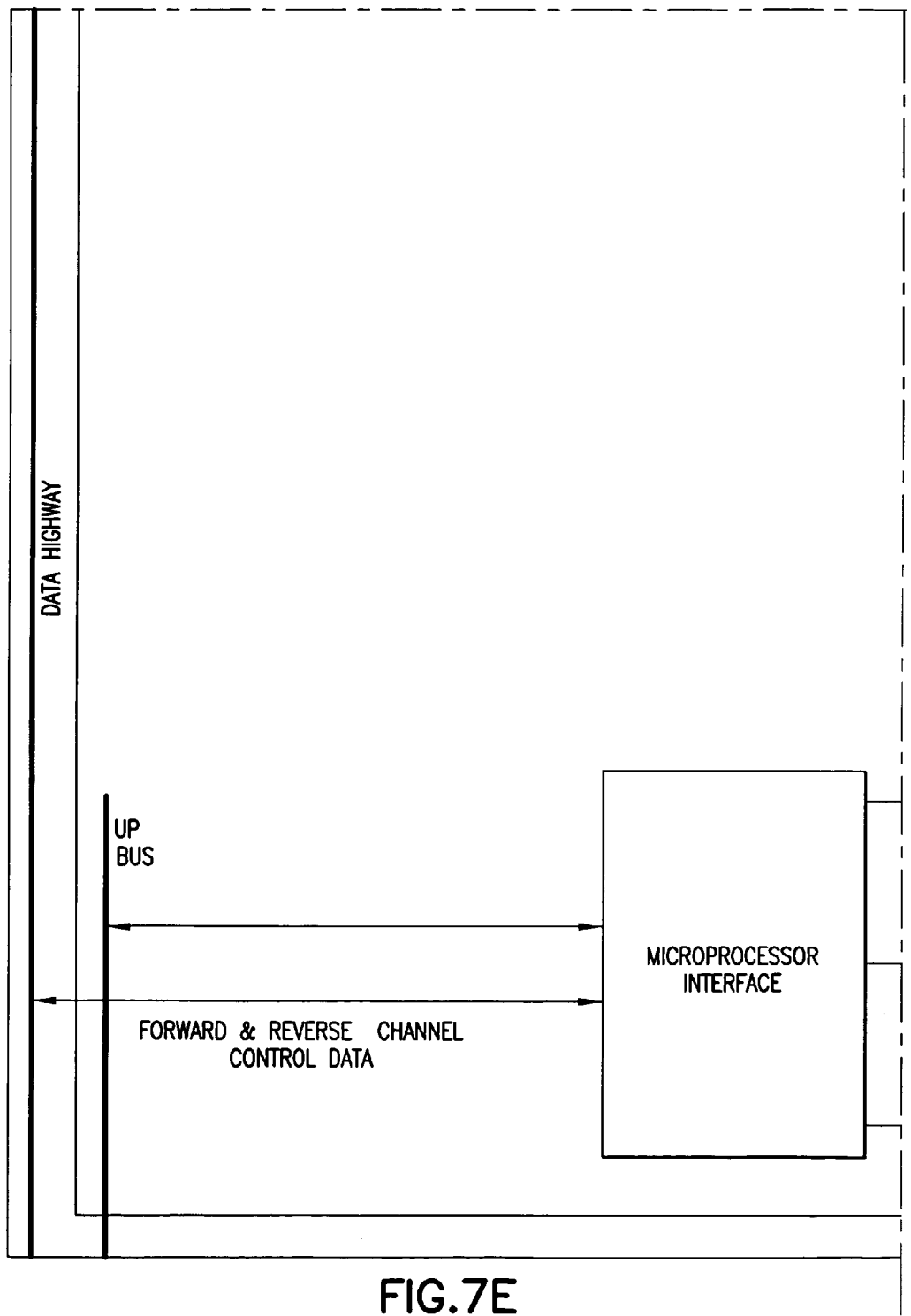
Figure 7F:
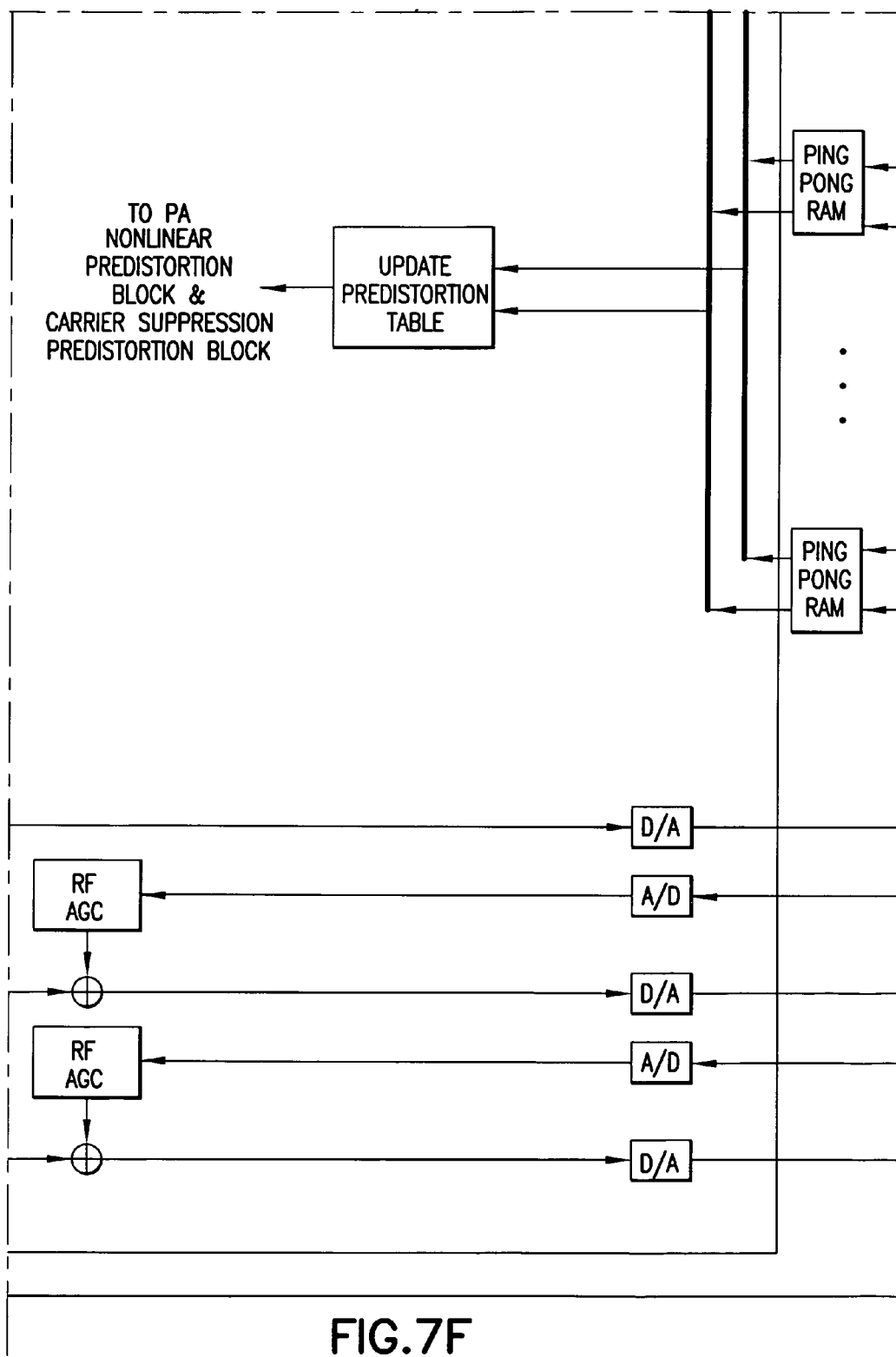
Figure 7G:
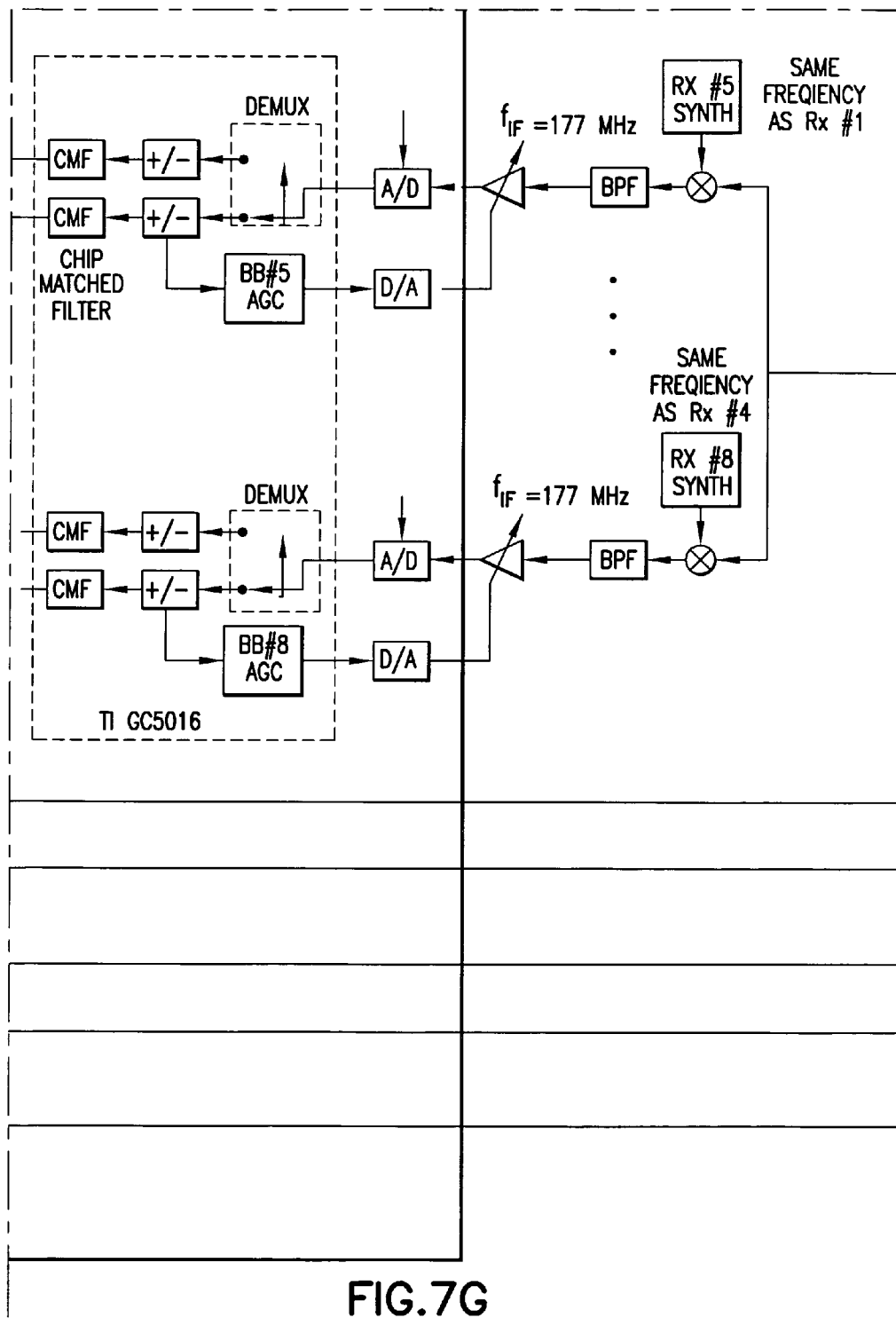
Figures 7, 7H:
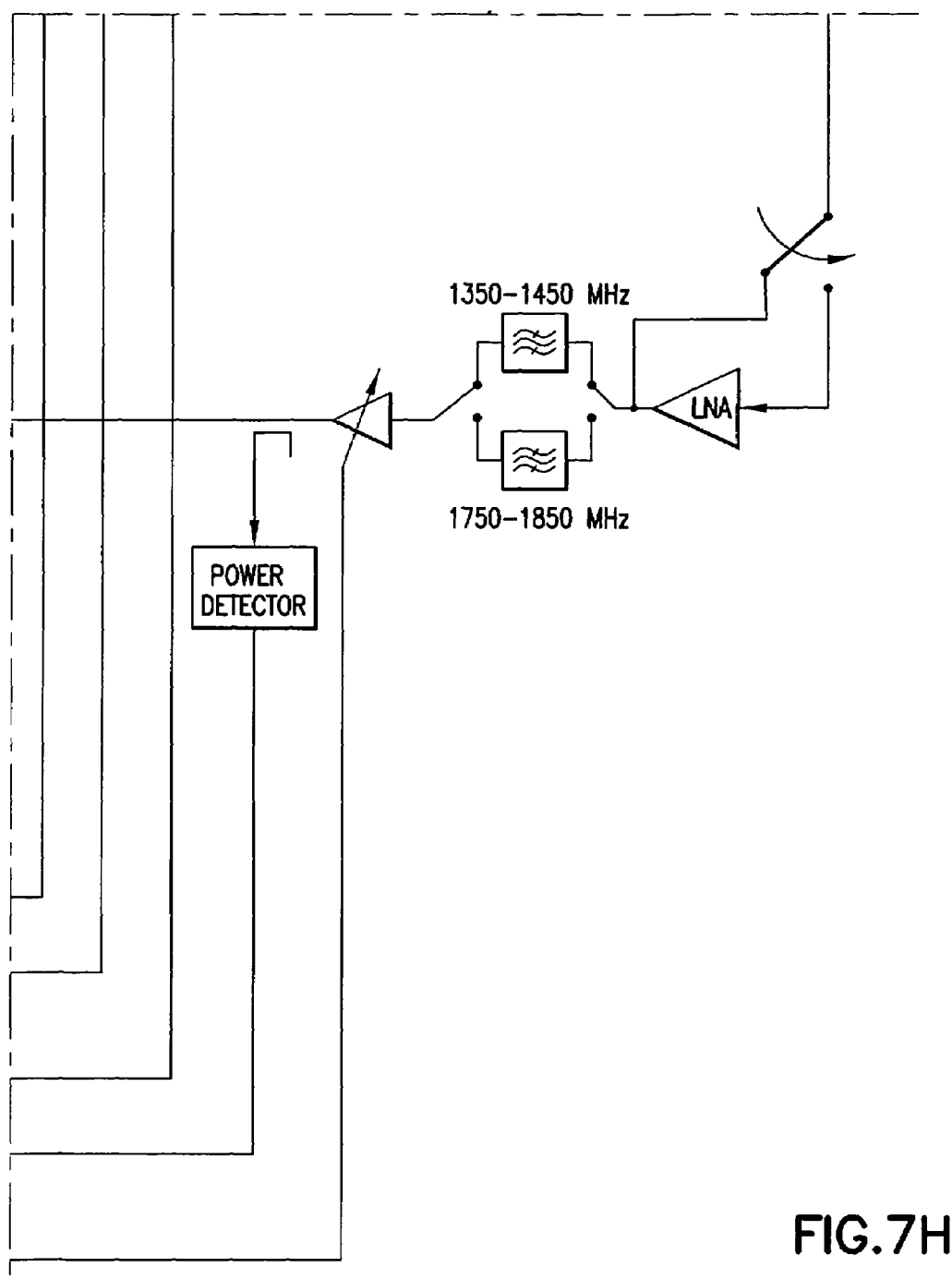

The following waveform parameters are deemed consistent with the preferred embodiment:

Spread spectrum chip rate=3 Mcps
Spread spectrum bit and symbol rate=200 kbps
error control coding at a rate 1/2 Turbo code
Spread spectrum processing gain=15
Maximum number of users per time-frequency slot (each mode)=8
time-frequency slot duration=10 msec
guard interval duration=1 msec
frequency bands of operation=about 4, each occupying 8.8 MHz or 3.4 MHz.
Time-partitioned mode symbol rate=1.586 Msps
Modulation in time partitioned mode=SOQPSK
Code-partitioned mode pulse shaping by root raised cosine filter with roll-off factor of 0.45
40 and 60 dB spectral bandwidths
packet size=1200 bps (payload) and 1800 bps (with overhead)
IP/GFP protocol FIG. 7 shows a spread spectrum multi-user receiver for use with the present waveform, such as that of FIG. 2. An antenna 83, filters 84, and analog-to-digital converters 85 are known in the art. A modem card 86 includes a field programmable gated array 87. A signal received at the antenna 83 is amplified at a low noise amplifier 88, filtered 84, and again amplified at an automatic gain control circuit 89. Following, it is downconverted 90 to baseband and filtered again at a bandpass filter 91 before being digitally sampled at an analog-to-digital converter 85 on the modem card 86. The signal is then demultiplexed 92, chip-wise filtered 93, and stored in a ping-pong RAM buffer 82. At this juncture, the entire set of user signals are stored in the RAM buffer 82. Timing, energy, and noise estimates are taken for each chip at a chip acquisition FIR filter, which includes the timing estimator 58 and amplitude estimator 70 described in the incorporated application entitled "Dispersed Pilot Signals for Estimating Timing Delay". The chips are despread at a matched filter 60. However, the chip acquisition filter 58, 70 also outputs to the matched filter 60, canceling the lower power user signals so the only signals operated on by the matched filter 60 are those with received power in the highest band. A MMSE equalizer performs multi-user detection 56 as described with reference to FIG. 5. The remaining circuitry of FIG. 7 is further detailed at co-owned U.S. patent application entitled "Multi-User Receiver and Method For Successive Acquisition", incorporated by reference above.

In the code-partitioned mode of FIG. 2, acquisition consists of synchronizing matched filters to each of the spread symbols and providing time of arrival and signal level estimates to be used for subsequent estimation and elimination of user cross talk. The search for the 8 users in each time/frequency/antenna bin is done simultaneously using the same data. Because the potential for high power users interfering with low power users, all 8 acquisitions do not necessarily occur simultaneously. Up to four acquisition cycles can occur on each burst, on each cycle previously detected signals are regenerated and subtracted from the search input.

It is noted that the present invention is not limited to the preferred embodiment as recited above, and that any individual parameter or combination of them may be adapted without departing from the broader aspects of the present invention. While there has been illustrated and described what is at present considered to be preferred and alternative embodiments of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A method for partitioning communication resource among multiple users comprising:
   partitioning at least a portion of an available communication resource into first mode time-frequency slots and second mode time frequency slots; and
   allowing multiple users to transmit in the first mode time-frequency slots using time division multiplexing and in the second mode time-frequency slots using spreading codes that are bounded by the respective second mode time-frequency slot,
wherein each of the time-frequency slots comprise a plurality of pilot symbols that are not all adjacent in time,
wherein the first mode time-frequency slots each comprise a concatenated series of time sub-slots in which the multiple users may separately transmit and a pilot symbol is present in less than all time sub-slots, and
wherein the second mode time-frequency slots each comprise a plurality of spread spectrum code sub-slots in which the multiple users may separately transmit and each code sub-slot comprises a plurality of pilot symbols.

2. The method of claim 1 wherein each of the time-frequency slots are separated by a guard interval during which no transmissions occur.

3. The method of claim 1 wherein one payload is present in each time sub-slot.

4. The method of claim 1 wherein more than one payload is present in each code sub-slot of a time-frequency slot.

5. The method of claim 1 wherein each of the modes enable an identical maximum number of disparate users to transmit in a time-frequency slot.

6. The method of claim 1 executed by a processor running a program that is tangibly embodied on a fixed medium.

7. The method of claim 1, wherein each of the time-frequency slots is bounded by a frequency that spans either 6.8 MHz or 3.4 MHz.

* * * * *